United States Patent
Klemba et al.

(10) Patent No.: US 9,213,581 B2
(45) Date of Patent: Dec. 15, 2015

(54) METHOD AND SYSTEM FOR A CLOUD FRAME ARCHITECTURE

(75) Inventors: Keith Klemba, Palo Allto, CA (US); Wesley Mukai, Palo Alto, CA (US)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 13/419,873

(22) Filed: Mar. 14, 2012

(65) Prior Publication Data

US 2013/0246589 A1  Sep. 19, 2013

(51) Int. Cl.

| | |
|---|---|
| *G06F 15/16* | (2006.01) |
| *G06F 15/173* | (2006.01) |
| *G06F 17/30* | (2006.01) |
| *G06F 11/10* | (2006.01) |
| *H04L 9/00* | (2006.01) |
| *G06F 9/50* | (2006.01) |
| *H04L 12/26* | (2006.01) |
| *H04L 29/08* | (2006.01) |
| *H04L 29/06* | (2006.01) |
| *G06F 15/17* | (2006.01) |
| *H04L 12/24* | (2006.01) |

(52) U.S. Cl.
CPC .......... *G06F 9/5072* (2013.01); *H04L 41/5096* (2013.01); *H04L 43/0817* (2013.01); *H04L 67/10* (2013.01); *H04L 67/1097* (2013.01); *G06F 15/17* (2013.01); *H04L 41/0213* (2013.01); *H04L 41/085* (2013.01); *H04L 63/20* (2013.01); *H04L 69/08* (2013.01)

(58) Field of Classification Search
None
See application file for complete search history.

(56) References Cited

U.S. PATENT DOCUMENTS

| 2005/0201304 A1* | 9/2005 | Olshansky .................... 370/282 |
|---|---|---|
| 2006/0150243 A1* | 7/2006 | French et al. .................... 726/11 |
| 2008/0171552 A1* | 7/2008 | Hyon et al. .................... 455/450 |
| 2009/0249473 A1* | 10/2009 | Cohn .............................. 726/15 |
| 2010/0223659 A1* | 9/2010 | Ekl et al. ............................ 726/4 |
| 2011/0022812 A1* | 1/2011 | van der Linden et al. ..... 711/163 |
| 2011/0246519 A1* | 10/2011 | Jansen .......................... 707/770 |
| 2012/0102486 A1* | 4/2012 | Yendluri ....................... 717/177 |
| 2012/0179779 A1* | 7/2012 | Awasthi ........................ 709/217 |
| 2012/0179909 A1* | 7/2012 | Sagi ...................... H04L 63/045 713/167 |
| 2012/0233478 A1* | 9/2012 | Mucignat ............ H04L 12/2825 713/320 |
| 2012/0254433 A1* | 10/2012 | Gujral et al. ................... 709/226 |
| 2012/0331528 A1* | 12/2012 | Fu et al. ............................ 726/4 |
| 2013/0067090 A1* | 3/2013 | Batrouni et al. ............. 709/226 |
| 2013/0091284 A1* | 4/2013 | Rothschild .................... 709/226 |
| 2013/0151924 A1* | 6/2013 | Beadle et al. ................. 714/763 |
| 2013/0173903 A1* | 7/2013 | Obligacion ................... 713/150 |
| 2013/0288642 A1* | 10/2013 | Yang ............................. 455/410 |

* cited by examiner

*Primary Examiner* — Ario Etienne
*Assistant Examiner* — Ho Shiu
(74) *Attorney, Agent, or Firm* — Fountainhead Law Group PC

(57) ABSTRACT

A cloud frame provides a framework comprising a monitoring and network services to support hardware nodes such as computing nodes and storage nodes. Cloud frames may be organized into a cluster of cloud frames. Hardware nodes in a cloud frame environment may conduct self-allocation of needed resources, which in turn may be provided by other hardware nodes in the cloud frame environment.

23 Claims, 9 Drawing Sheets

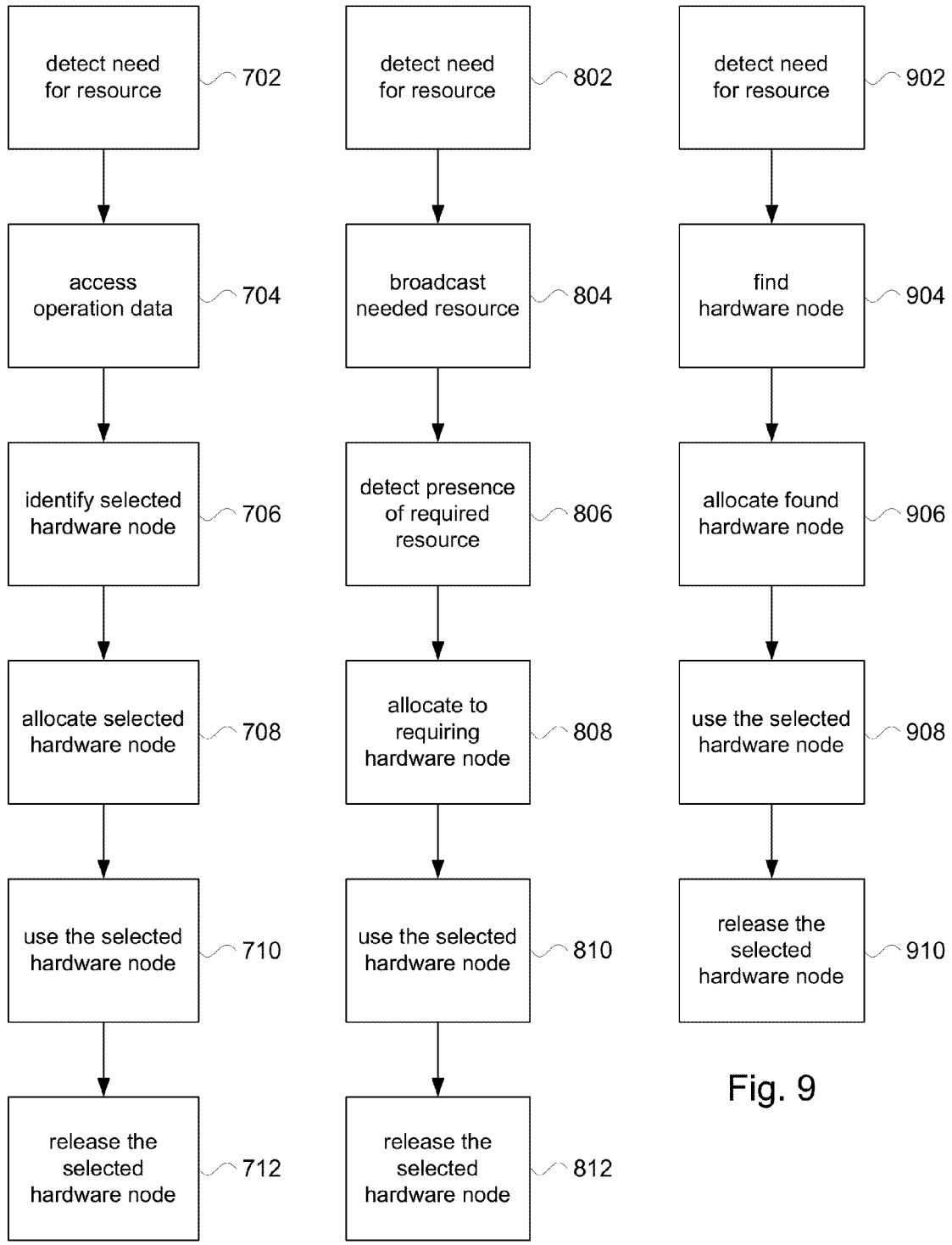

METHOD AND SYSTEM FOR A CLOUD FRAME ARCHITECTURE

BACKGROUND

Unless otherwise indicated herein, the approaches described in this section are not prior art to the claims in this application and are not admitted to be prior art by inclusion in this section.

Business systems in an enterprise have traditionally been focused on providing software-based solutions. Customers have been increasingly interested in "appliance" and "managed service" technologies, which emphasize hardware as well as software in providing a well-rounded solution to the needs of a modern business. Conventional wisdom has been to acquire, partner with, or build the necessary technologies traditionally resident in hardware companies and third-party service organizations and to combine these system components to create a solution. The resulting solution is often a heterogeneous mix of systems and services that may not be easy to manage across the solution lifecycle and may not provide the desired total cost of ownership profile for a customer.

BRIEF DESCRIPTION OF THE DRAWINGS

FIG. 7 illustrates an example of a process flow for "self allocation".

FIG. 8 illustrates an example of a process flow for "broadcast allocation".

FIG. 9 illustrates an example of a process flow for "managed allocation".

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figures 1, 2:
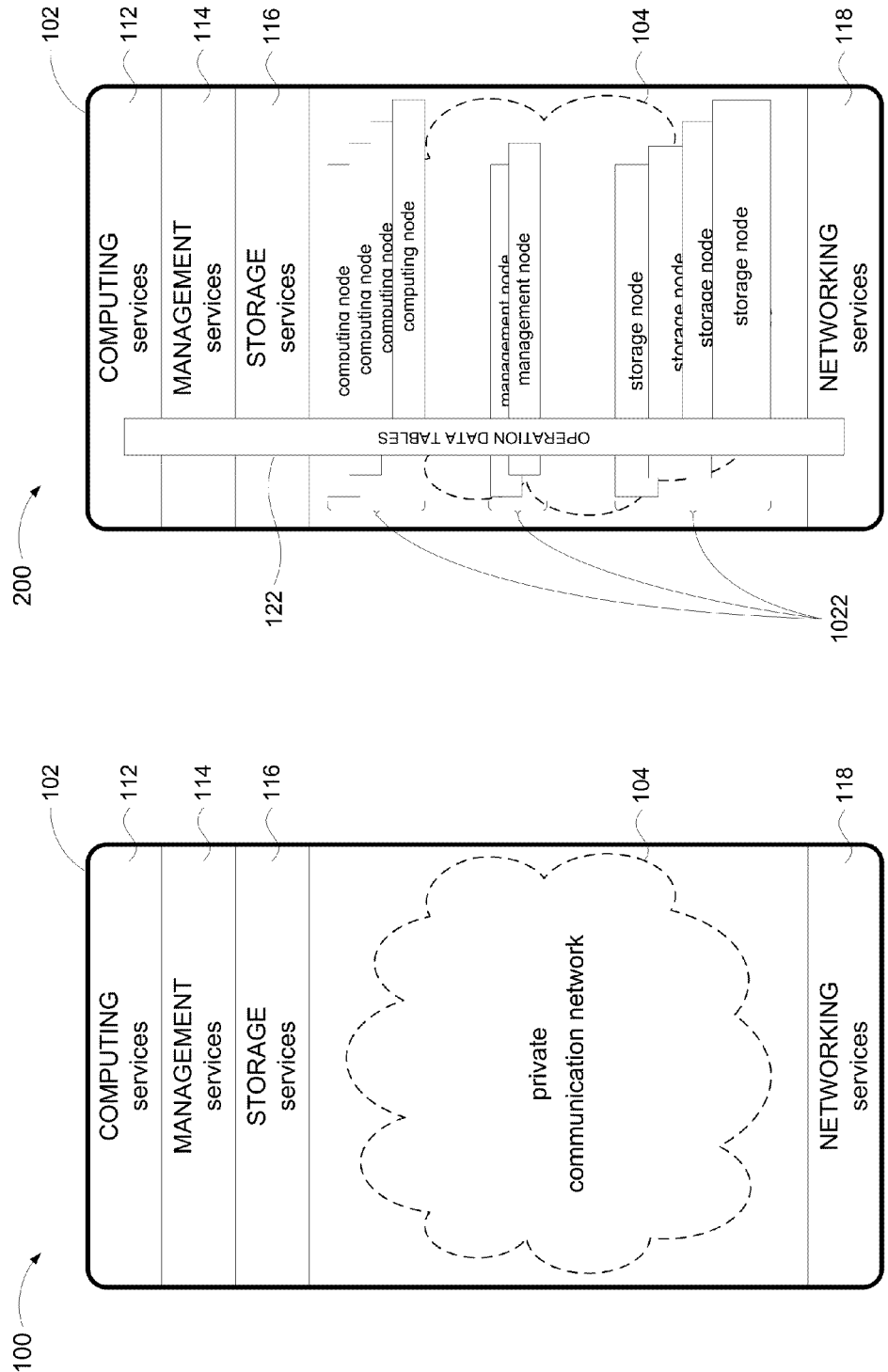
FIG. 1 shows an illustrative embodiment of the framework of the cloud frame architecture.
FIG. 2 illustrates an example of cloud frame having hardware nodes.

In general terms, a "cloud frame" in accordance with principles of the present disclosure provides a hardware and software product delivery framework to deliver a range of products and services into an enterprise. A cloud frame supports an architecture of hardware nodes, applications (e.g., business software), and services to orchestrate the collaboration of hardware components and applications using a specific collection of hardware nodes to provide resources and services such as computing resources, storage resources, networking resources, and management resources. Referring to FIG. 1, in an embodiment, a cloud frame 100 may constitute an infrastructure that comprises a computing backbone 102 and a private communication network 104. Elements of the cloud frame 100 may provide several services 112, 114, 116, and 118 to define, support, secure, and otherwise manage the infrastructure.

The computing backbone 102 of the cloud frame 100 provides a well managed private computing infrastructure which may be used to implement various information technology solutions. These solutions may be used with other systems, for example, to support various business operations of an enterprise. In some embodiments, the computing backbone 102 may comprise one or several hardware nodes. Examples of "hardware nodes," in accordance with the present disclosure, include computing nodes, storage nodes, and management nodes, which will be discussed in more detail below. The hardware nodes may be deployed in a single location, distributed in several locations of an enterprise and interconnected by a suitable communication network (e.g., a local area network (LAN), a wide area network (WAN), and so on), or distributed in several locations of an enterprise using a public infrastructure service provider and interconnected by a suitable communication network; e.g., a LAN, WAN, etc.

The private communication network 104 of the cloud frame 100 provides an exclusive and secure communications infrastructure between the hardware nodes within the cloud frame. The private communication network 104 may be realized with typical networking components having varying capabilities, for example, 1 gigabit Ethernet (GbE), 10 GbE, 40 GbE, and so on, and employing various internetworking technologies for example, VLANs and VPNs for communication. The communication network 104 is "private" insofar as communications between hardware nodes in the cloud frame 100 are isolated and secured from communications outside the cloud frame. In some embodiments, the private communication network 104 may comprise one or several data switches, routers, and other networking equipment to which hardware nodes may be connected. In some embodiments, portions of the private communication network 104 may be implemented over a LAN, WAN, a public communication network such as the Internet, combinations of the foregoing, and so on. Thus, in accordance with principles of the present disclosure, the private communication network 104 can provide the security of a private network for the cloud frame 100 irrespective of whether the underlying communications infrastructure includes private networks or public networks.

The cloud frame 100 may provide management services 114 in order to manage the computing backbone 102 including the hardware nodes and software elements installed in the cloud frame. In some embodiments, the management services 114 may be the first services to come online and oversee the orderly bootup of all other components in the cloud frame 100. Other management services 114 may be configured to continuously monitor the health and security of the cloud frame 100. For example, ports on the physical switches to which the hardware nodes are physically connected (e.g., a 10BASE-T connector, a fiber channel optical connector, etc.) may be monitored for access and authentication (e.g., media access control (MAC) address, Universal Unique Identification (UUID) attributes, and the like). Management services 114 may include event detection and event handling based on policy enforcement, and so on.

The management services 114 provides management of hardware nodes at the component level. The management services 114 may include end-to-end lifecycle management of the hardware nodes of the cloud frame 100, of the software components (e.g. application or database components) of the cloud frame 100, and so on. For example, the management services 114 may track hardware versions, software versions, or customer configuration data, or bring hardware nodes online and take them offline, and so on. Additional functions performed by the management services 114 are discussed below. In some embodiments, standard management services protocols may be used to facilitate cooperation and integration with other management solutions; for example, simple network management protocol (SNMP).

The networking services 118 of the cloud frame 100 may be used to create and manage the private communication network 104. The networking services 118 may configure the constituent data switches of the private communication network 104 to define one or more LANs, tagged or untagged VLANs or WANs, to establish dynamic communication channels among hardware nodes within the cloud frame 100, and so on. In some embodiments, a communication channel may be defined by an internet protocol (IP) specifying endpoints with an IP address (e.g., 10.6.1.10). In some embodiments, the endpoint IP address may specify a particular port number (e.g., 10.6.1.10:128). A communication channel may also be defined by the connection between a hardware node and a port on one of the data switches of the private communication network 104.

In embodiments, the private communication network 104 may comprise managed switches which allow the networking services 118 to provide dynamic interconnects among hardware nodes. For example, suppose a given hardware node is a storage node, the networking services 118 may allocate a high speed switch to the storage node and define a communication channel from a computing node to the storage node via the high speed switch. In an embodiment, a communication channel may be configured with data encryption to further enhance security in the communication. For example, an encrypted communication channel may be especially suitable in a configuration where the private communication network 104 includes transport over a public communication network such as the Internet. In another embodiment, the networking services 118 may define one or more virtual private networks (VPNs) and allocate communication channels over the VPN. As with the encrypted communication channel, a VPN may be especially suitable in a configuration where the private communication network 104 includes transport over a public communication network.

Figure 2A:
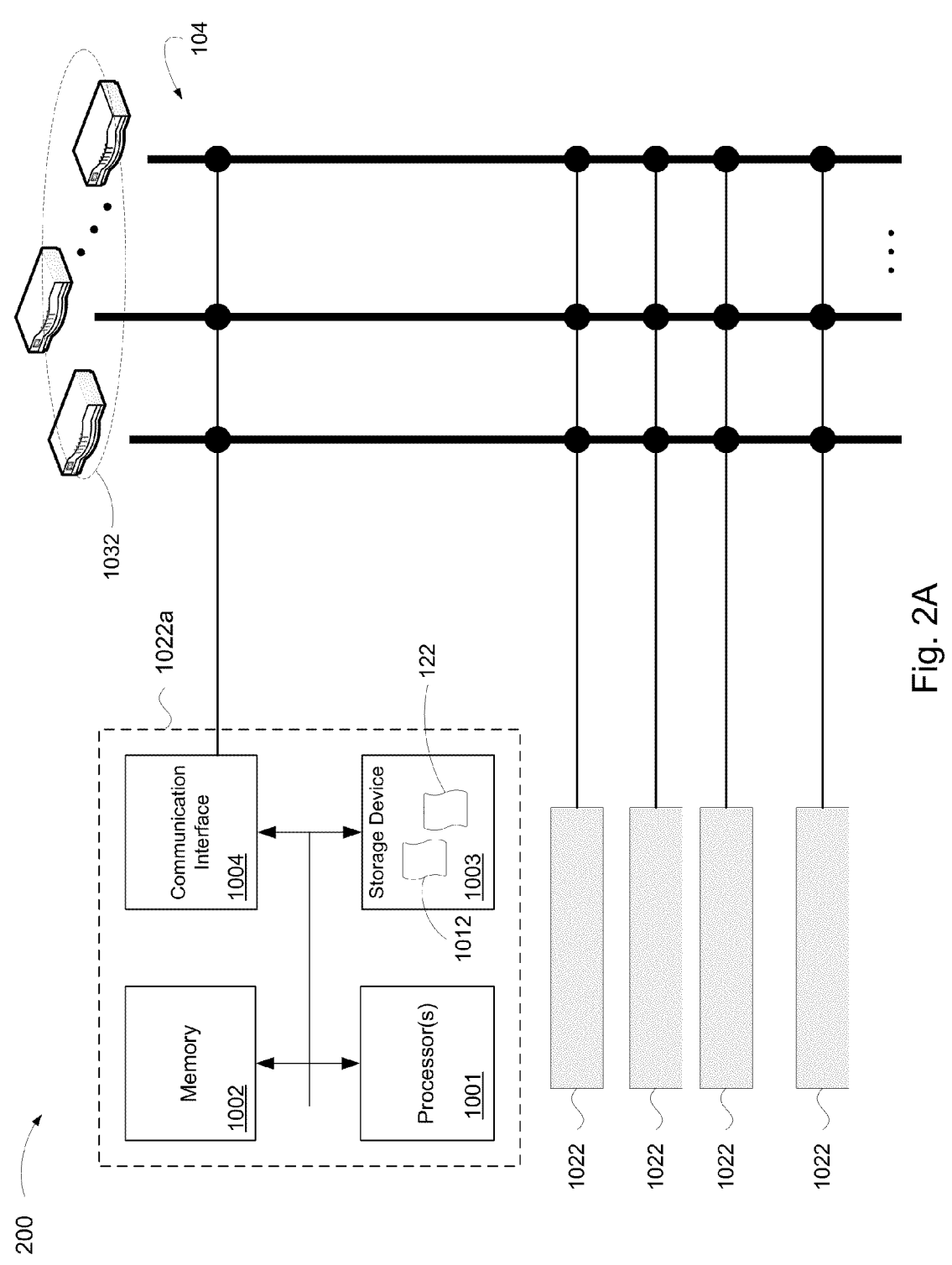
FIG. 2A is an illustrative implementation of the cloud frame shown in FIG. 2.

Referring now to FIGS. 2 and 2A, an example of a cloud frame 200 is shown with several installed hardware nodes 1022. In some embodiments, the hardware nodes 1022 may be loosely classified into the following categories: computing nodes, management nodes, and storage nodes, based on their primary function. It will be appreciated, of course, that hardware nodes 1022 may perform more than one function, making this classification imprecise. Consequently, there are no requirements on the exactness of this classification of the hardware nodes 1022. The classification may, nonetheless, help describe the primary function of the hardware nodes 1022 deployed in a cloud frame 200.

In accordance with principles of the present disclosure, the computing backbone 102 of the cloud frame 100 is defined, supported, and secured by a set of operation data tables 122. As will be explained in more detail below, the operation data tables 122 store information about the cloud frame configuration; for example, a list of hardware nodes 1022 installed in the cloud frame 200. The operation data tables 122 store status information relating to the operational and associative state of each installed hardware node in order to facilitate dynamic management and configuration of the hardware nodes 1022. In embodiments, the operation data tables 122 may be fully distributed among the hardware nodes 1022. For example, in an embodiment, the operation data tables 1022 may be instanced in a network attached storage (NAS), a network file system (NFS), or any other well known data sharing technologies. In addition, each hardware node 1022 may have a local store of operation data tables 122.

Referring to FIG. 2A, the private communication network 104 may comprise a variety of data switches 1032, such as routers, bridges, managed switches, and so on, to provide the switching capability described above. Hardware nodes 1022 may be physical computing devices that typically include a processor, memory, and physical storage. In some embodiments, hardware nodes 1022 may include instantiations of virtual machines on a virtualization platform.

As can be seen in FIG. 2A, a typical physical hardware node 1022a may comprise one or more processors 1001, a memory 1002 (e.g., dynamic random access memory, DRAM), local storage 1003, and a communication interface 1004. The hardware node 1022a may be configured with executable program code 1012 to provide the functionality of the computing services 112, the management services 114, the storage services, and networking services 118 of the cloud frame 100. The data storage device 1003 may store executable program code 1012 which may be executed by the processor component 1001, local operation data tables 122, and so on. The communication interface 1004 may be configured for operation with the data switches 1032 in order to provide constant monitoring of the hardware nodes that may be connected to the ports of the data switches. The hardware node 1022a may be connected to one or more of the data switches 1032 via one or more of the communications interfaces 1004.

Hardware nodes 1022 in a cloud frame 200 may be provisioned in a single location; for example, the hardware nodes may be deployed in a single rack or a co-located cluster of racks. In some embodiments, the cloud frame 200 may be distributed. For example, some of the hardware nodes 1022 may be distributed in several locations within an enterprise and connected via a LAN and/or WAN defined by the private communication network 104. Some of the hardware nodes 1022 may be located outside of the enterprise, in which case the private communication network 104 may extend over a public communication network such as the Internet.

Hardware nodes 1022 that are classified as computing nodes primarily provide general computing resources. Typically, computing nodes provide some form of computation or functionality under the execution of applications software. A non-exhaustive list of examples include database functionality, computational capability, data warehousing functionality, business applications such as customer relations management (CRM), and so on. Computing nodes may also provide some management and storage resources and services.

Hardware nodes 1022 that are classified as management nodes primarily provide management computing resources. A management node may require different physical interfaces, protocols, and authorizations than other nodes. A management node may manage a computing node, a storage node, or even another management node. Consider, for example, an in-memory database called the SAP® High-Performance Analytic Appliance (SAP HANA). SAP® HANA may be configured with a management service referred to as the HANA dashboard. A computing node may be installed to operate the in-memory database component of SAP® HANA, while a management node may be installed to operate the HANA dashboard component. In a more generalized example, a management node may be used to coordinate communications and data sharing among different computing nodes. In some embodiments, the management nodes may provide the majority of management services 114. However, some management services 114 may also be supported on computing nodes and storage nodes. The management services 114 provided by management nodes span a wide range of activities in the cloud frame 100. Management nodes may provide everything from low level network provisioning to high level application and database management functions.

Hardware nodes 1022 that are classified as storage nodes fundamentally provide data storage resources. Typical storage nodes may support distributed storage technologies like, network attached storage (NAS), storage area network (SAN), and so on.

In some embodiments, the cloud frame may provide communication interfaces to allow for communication between the cloud frame computing backbone 102 and devices external to the cloud frame 100. To minimize the impact of the cloud frame on its surrounding landscape, embodiments in accordance with the present disclosure provide predefined communication interfaces.

Figure 3:
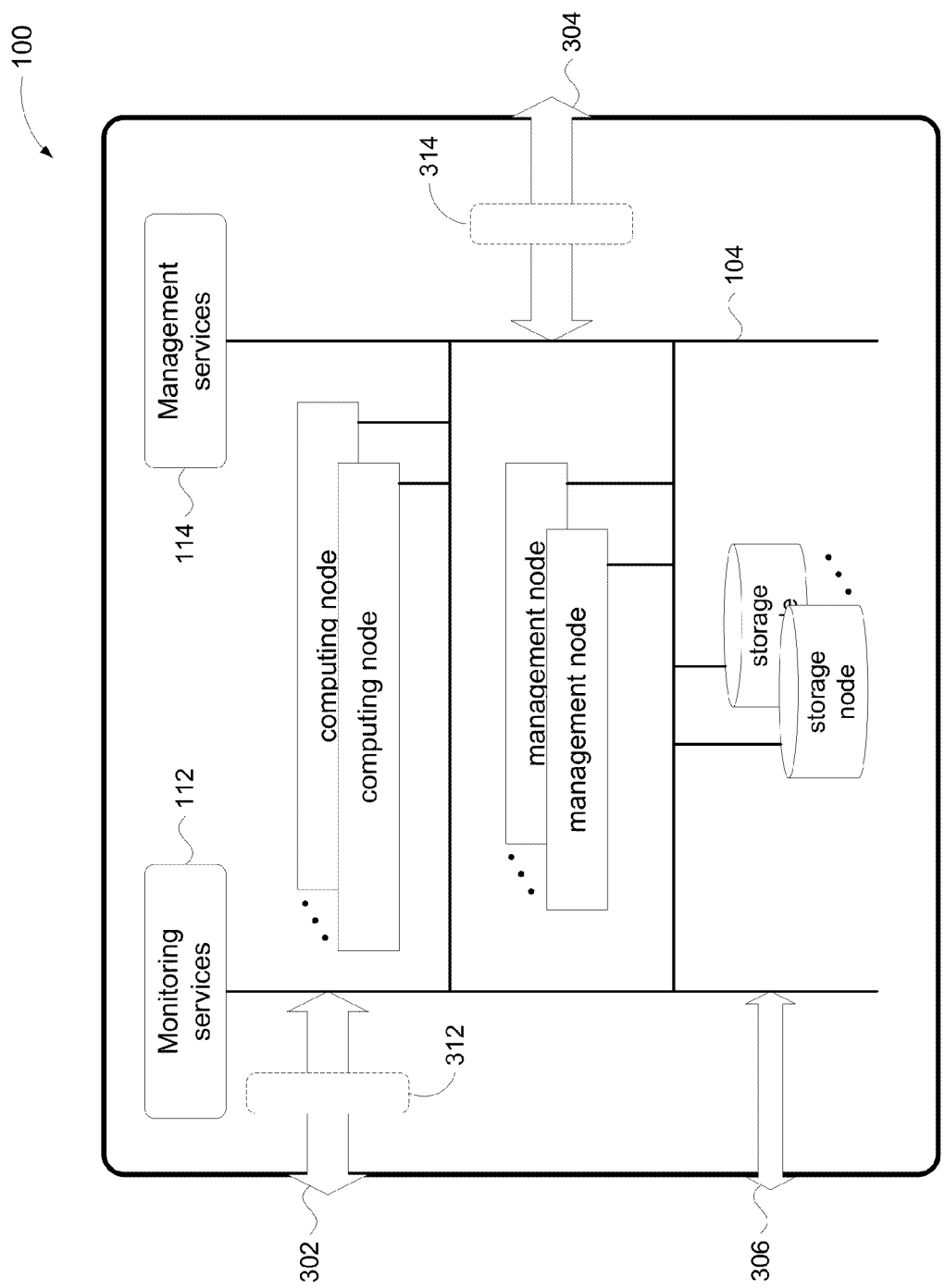
FIG. 3 is a block diagram illustrating external interfaces to a cloud frame.

Referring to FIG. 3, for example, in an illustrative embodiment the cloud frame 100 may present three interfaces 302, 304, and 306, each being associated with a unique IP address. The interfaces 302-306 provide the necessary communication channels to the internal components of the cloud frame 100 by interconnection to the private communication network 104. All communications with devices outside the cloud frame taking place across these interfaces 302-306. Additionally, these interfaces may be monitored by the cloud frame's management services 114 in order to ensure secured operations within the cloud frame. Any detected suspicious activity may trigger an event in the management services component 114 of the cloud frame 100 for appropriate action (e.g., reporting to an administrative user, blocking certain communications, etc.).

An application services interface 302 may provide communication channels between external devices (e.g., client machines, other cloud frames, and so on) and the applications running on the computing backbone 102 of the cloud frame 100 (e.g., DB application, CRM, and so on) only if the application supports exposed APIs on the application services interface 302. In an embodiment where the application services interface 302 presents only one IP address, an arbitrator 312 may be provided to arbitrate the communications between external devices and the various computing nodes 132. In some embodiments, this same arbitration may be used internally between nodes on the computing backbone 102. For example, an SAP® Netweaver-based architecture may be deployed in the cloud frame 100 to provide the functionality of the arbitrator 312 in the form of an Enterprise Service Bus (ESB).

An administrative services interface 304 may provide communication channels between selective cloud frame management services 114 and external devices (e.g., administrative clients, other cloud frames, and so on). In some embodiments, the administrative services interface 304 may be provided via a VPN router 314, so that a remotely situated administrative user can have secured access to the cloud frame 100 even if they are accessing over a public communication network. In some embodiments, the administrative services interface 304 may be used by the management nodes in order to communicate with external devices such as administrative clients, other cloud frames, and so on.

A data management services interface 306 may provide data access services for external devices (e.g., servers, other cloud frames, and so on) in order to support data exchanges with the cloud frame storage nodes. In some embodiments, port and/or source address mapping may be used to coordinate the flow of data between external devices and the storage nodes so that the data management services interface 306 may be configured with only one IP address.

In embodiments, hardware nodes 1022 deployed within the cloud frame 100 enjoy their own private networks defined on the private communication network 104, where the management services 114 provide continuous health and security monitoring. Additional hardware nodes 1022 may be securely incorporated into the cloud frame 100 at any time. Generally, a new hardware node is installed without any application software. The new hardware node might include only special baseline software (e.g., provided by the hardware distributor), to run self check diagnostics and generate performance benchmarks to facilitate tuning the new hardware node to optimize performance with the computing backbone 102 within the cloud frame 100. Software may then be delivered subsequent to installing the hardware node, through a secure management channel, using for example the administrative services interface 304, and loaded onto the new hardware node. In some embodiments, the software may be "certified" in that the software will have been verified and digitally signed to ensure its source and correctness of functionality.

In some embodiments, the management services 114 may detect the connection of a new hardware node to the private communication network 104. For example, a MAC address of the hardware node may be detected by the management services 114 monitoring the private communication network 104 when the hardware node is powered on. As a security measure, the management services 114 may initially assign a "zombie" virtual LAN (VLAN) to the switch port to which the new hardware node is connected. By connecting the new hardware node with a communication channel to the zombie VLAN, communications from the new hardware node are effectively isolated from the other communication channels in the cloud frame 100, thus protecting already installed hardware nodes from potential attacks by the new hardware node. For example, if a new hardware node is loaded with software that is not certified, the cloud frame 100 may isolate the new hardware node with its un-certified software from the other hardware nodes directing its communications to the zombie VLAN. The management services 114, however, may subsequently release the new hardware node to an appropriate private network defined on the private communication network 104. For example, an administrative user once convinced of its authenticity, may explicitly release the new hardware node and allow for its inclusion in a private communication network 104 defined in the cloud frame.

Referring to FIG. 2, the hardware nodes 1022 of the cloud frame 100 may be operated in any suitable configuration. For example, each computing node may execute one or more applications independently of the other computing nodes. A computing node may have dedicated access one or more storage nodes. A storage node may be shared by multiple computing nodes. A management node may be configured to manage the storage nodes (e.g., provide load balancing, backups, etc.). It can be appreciated that myriad other operational configurations of hardware nodes 1022 are possible.

Clusters of Cloud Frames

Figure 4:
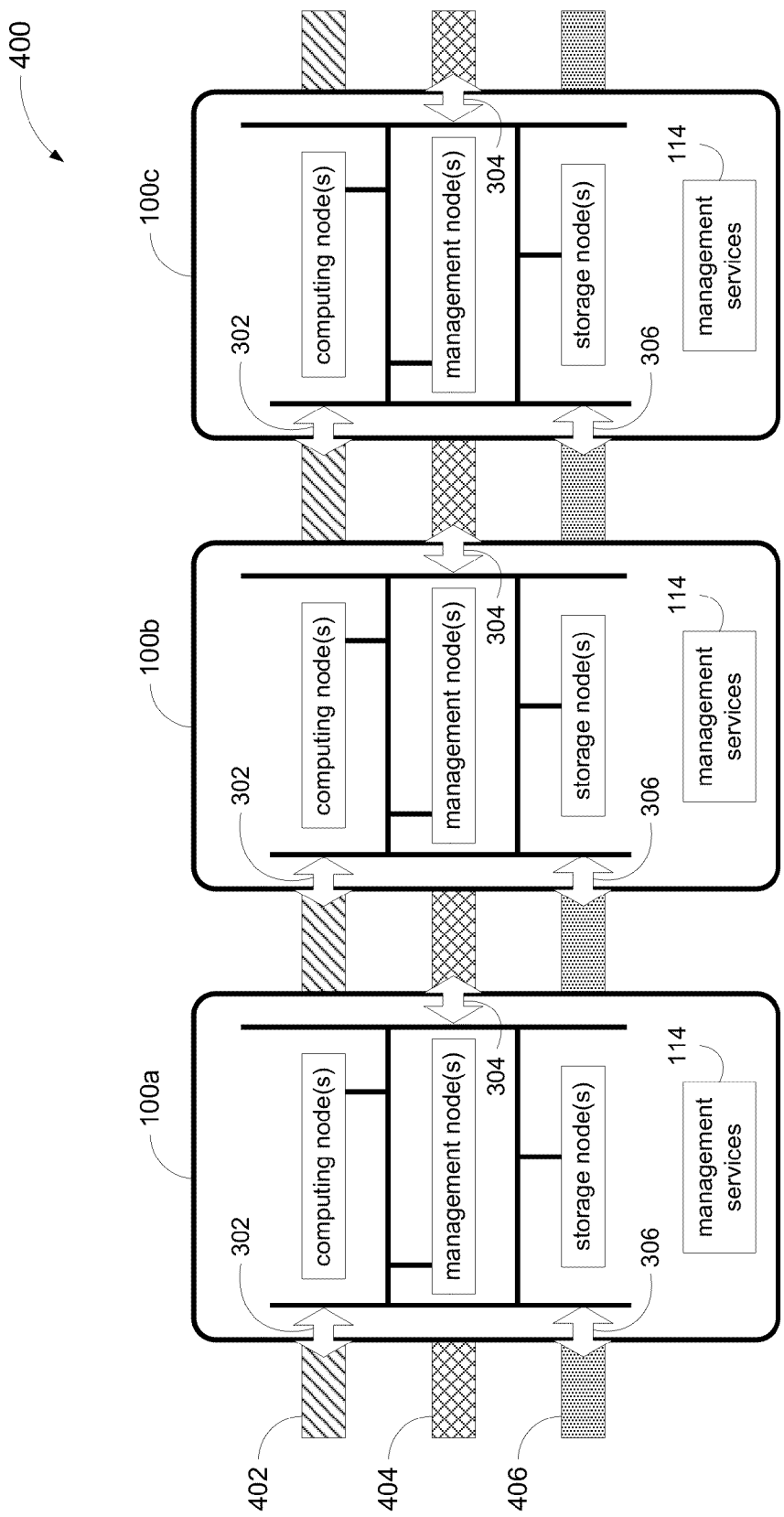
FIG. 4 shows an example of a cluster of cloud frames.

In some embodiments, the cloud frame 100 may be associated with other cloud frames in a manner that creates a cloud frame cluster. Referring to FIG. 4, an example of a cluster 400 comprising cloud frames 100a, 100b, and 100c is shown. The cloud frames 100a-100c may be interconnected by connecting the interfaces 302, 304, and 306 to respective communication paths 402, 404, and 406. For example, the application services interfaces 302 of each cloud frame 100a-100c may be connected to an application services communication path 402. Likewise, the administrative services interfaces 304 may be connected to an administrative services communication path 404, and the data management services interfaces 306 may be connected to a data management services communication path 406. In some embodiments, the administrative services communication path 404 may also be used by the management services 114 of each cloud frame 100a-100c in the cluster 400, allowing the management services of each cloud frame in the cluster to coordinate their activity.

The cloud frames 100a-100c in cluster 400 may be configured for independent operation, each operating independently of one another. In such a configuration, each cloud frame 100a-100c may operate as described above. However, a clustering architecture in accordance with the present disclosure provides a high degree of flexibility in configuring systems. More specifically, the computing nodes represent computing resources that may be shared among cloud frames 100a-100c within the cluster. Likewise storage resources may be shared between cloud frames by sharing storage nodes across the cloud frames 100a-100c, and similarly for management nodes for providing management resources.

Figure 4A:
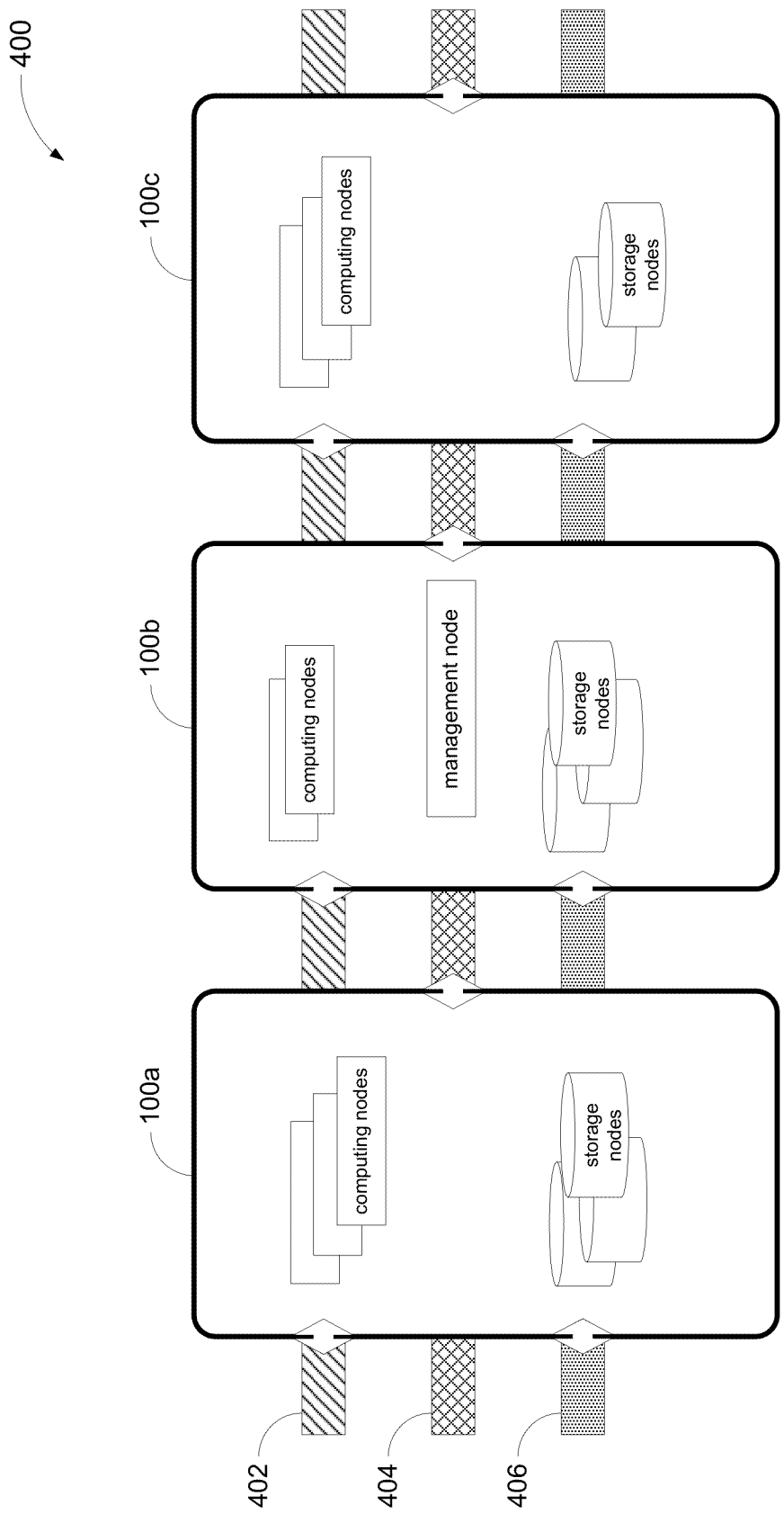
FIG. 4A illustrates an example of sharing hardware nodes between cloud frames in a cluster.

For example, referring to FIG. 4A, the entire cluster 400 may be configured to operate as a unified enterprise-level business system. For example, software components of the enterprise business system may be implemented among the several computing nodes of the cloud frames 100a-100c. The storage nodes among the cloud frames 100a-100c may provide data storage services for the computing nodes, including crossing cloud frame boundaries. In other words, a storage node in cloud frame 100a may service the storage requirements for a computing node in cloud frame 100c. A management node may be configured (e.g., in cloud frame 100b) to coordinate the activities of the computing nodes and otherwise manage the entire cluster 400.

Virtual Cloud Frames

FIG. 4A illustrated an example of sharing the hardware nodes 1022 in the cluster 400 to configure the cluster to operate as a single enterprise-level business system. In accordance with the present disclosure, the hardware nodes 1022 in a cluster may also be shared to configure multiple independent systems. In some embodiments, a cluster of cloud frames may define one or more "virtual" cloud frames. A virtual cloud frame is "virtual" in that the constituent hardware nodes of the virtual cloud frame may be allocated from several physical cloud frames within a cluster.

Figure 5:
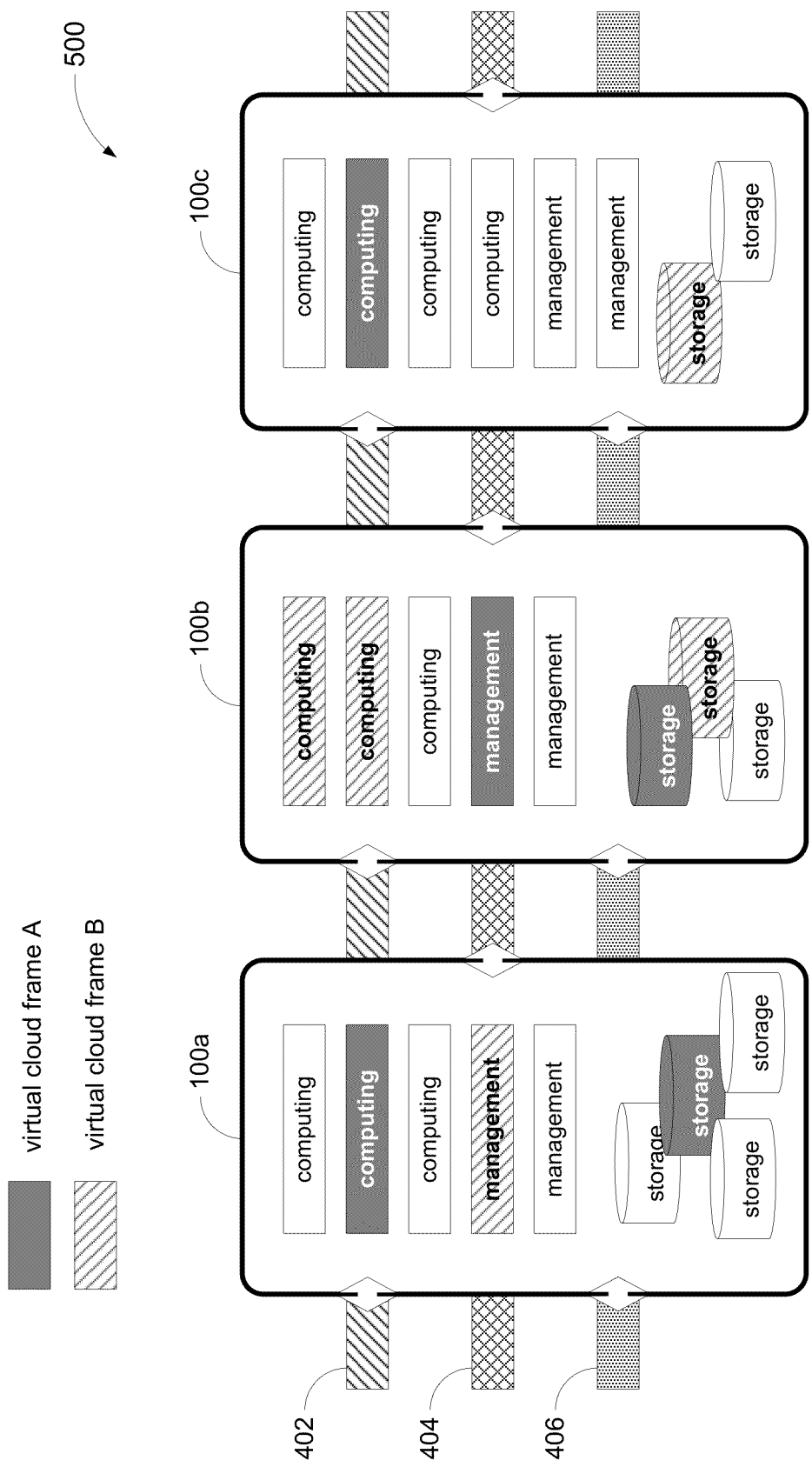
FIG. 5 shows an example of virtual cloud frames in a cluster.

Referring to FIG. 5, illustrative examples of virtual cloud frames are shown in a cluster 500 of physical cloud frames 100a, 100b, and 100c. Virtual cloud frame A comprises a computing node from cloud frame 100a and from cloud frame 100c and storage nodes from cloud frames 100a and 100b. A management node from cloud frame 100b manages the activity of virtual cloud frame A. Similarly, virtual cloud frame B comprises two computing nodes from cloud frame 100b and storage nodes from cloud frames 100b and 100c. A management node from cloud frame 100a manages the activity of virtual cloud frame B.

Operation Data Tables

Recall from FIG. 2 that the cloud frame 200 includes operation data tables 122 which contain the defining and operating information of the cloud frame, including cluster membership, the cloud frame infrastructure (e.g., computing backbone 102 and private communication network 104), and any installed hardware nodes 1022. Information in the operation data tables 122 may be provided when a given hardware node (e.g., computing node) is installed. For example, an administrator may input information (e.g., via the management services 114) into the operation data tables 122 associated with the given hardware node. In accordance with the present disclosure, the hardware node itself may update information in its associated operation data tables during its operation, thus providing a current operating state of the hardware node. Similarly, the management services 114 of the cloud frame 200 may update operation data tables associated with the cloud frame infrastructure itself.

Figure 6A:
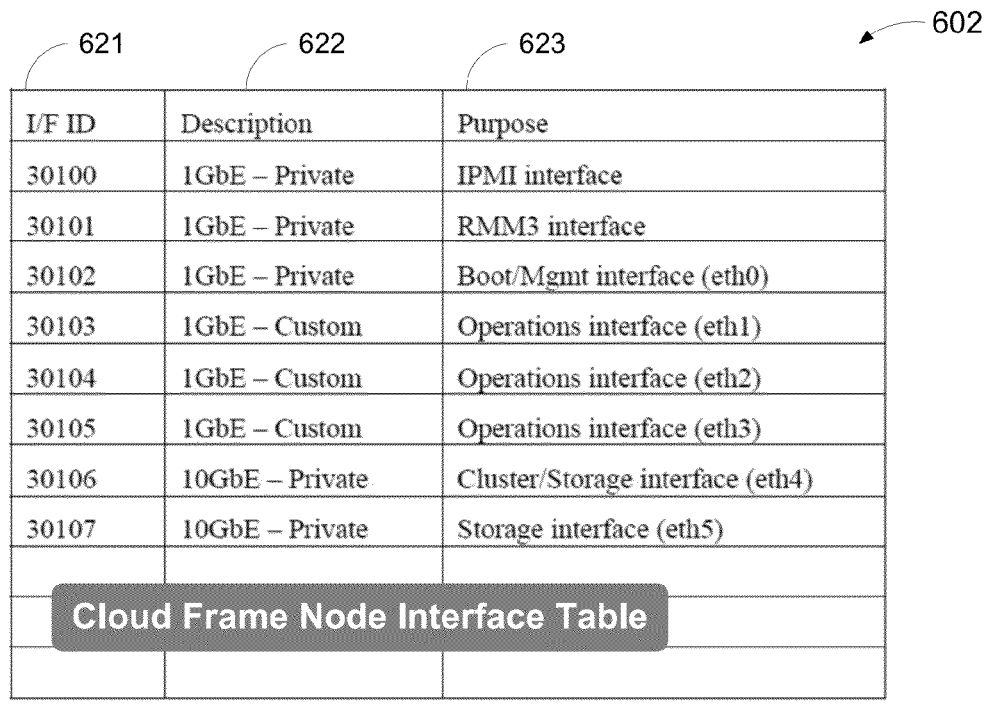
FIGS. 6A, 6B, 6C, and 6D are examples of operation data tables.
Figure 6B:
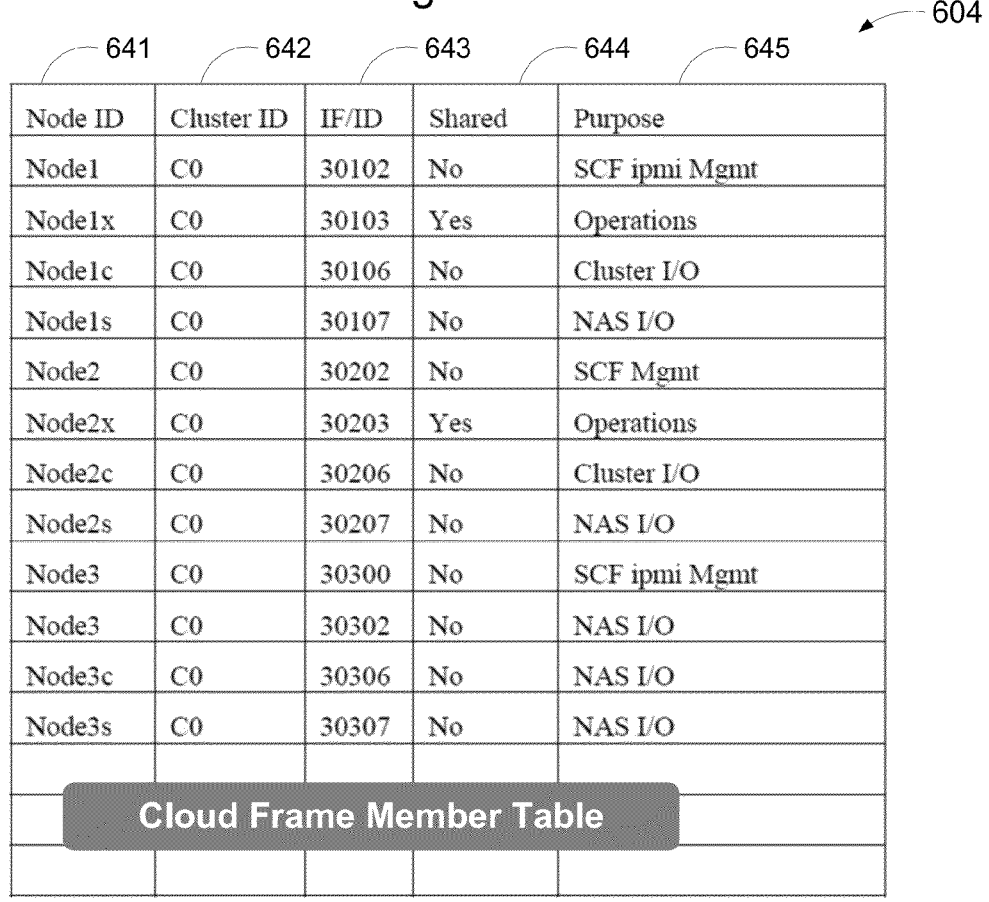
Figure 6C:
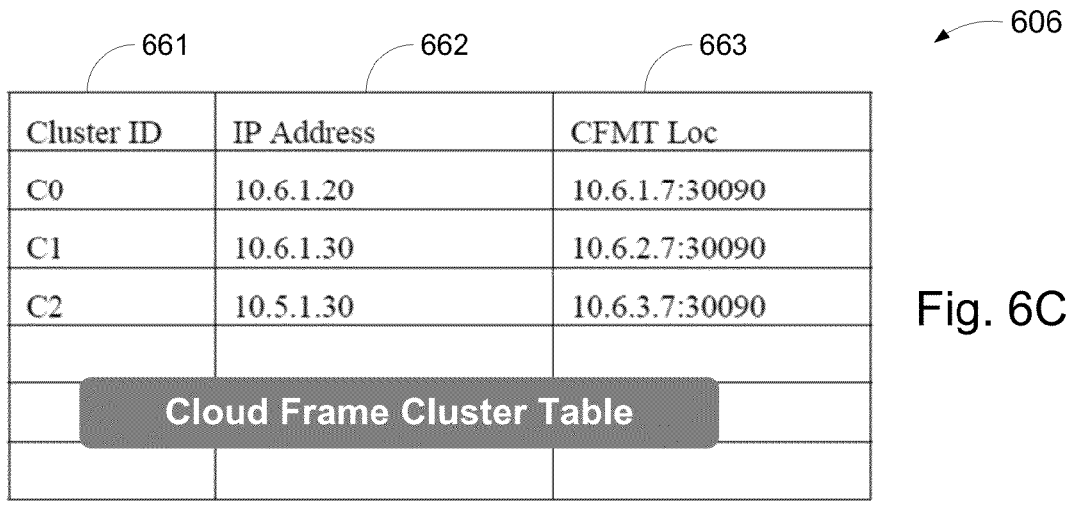
Figure 6D:
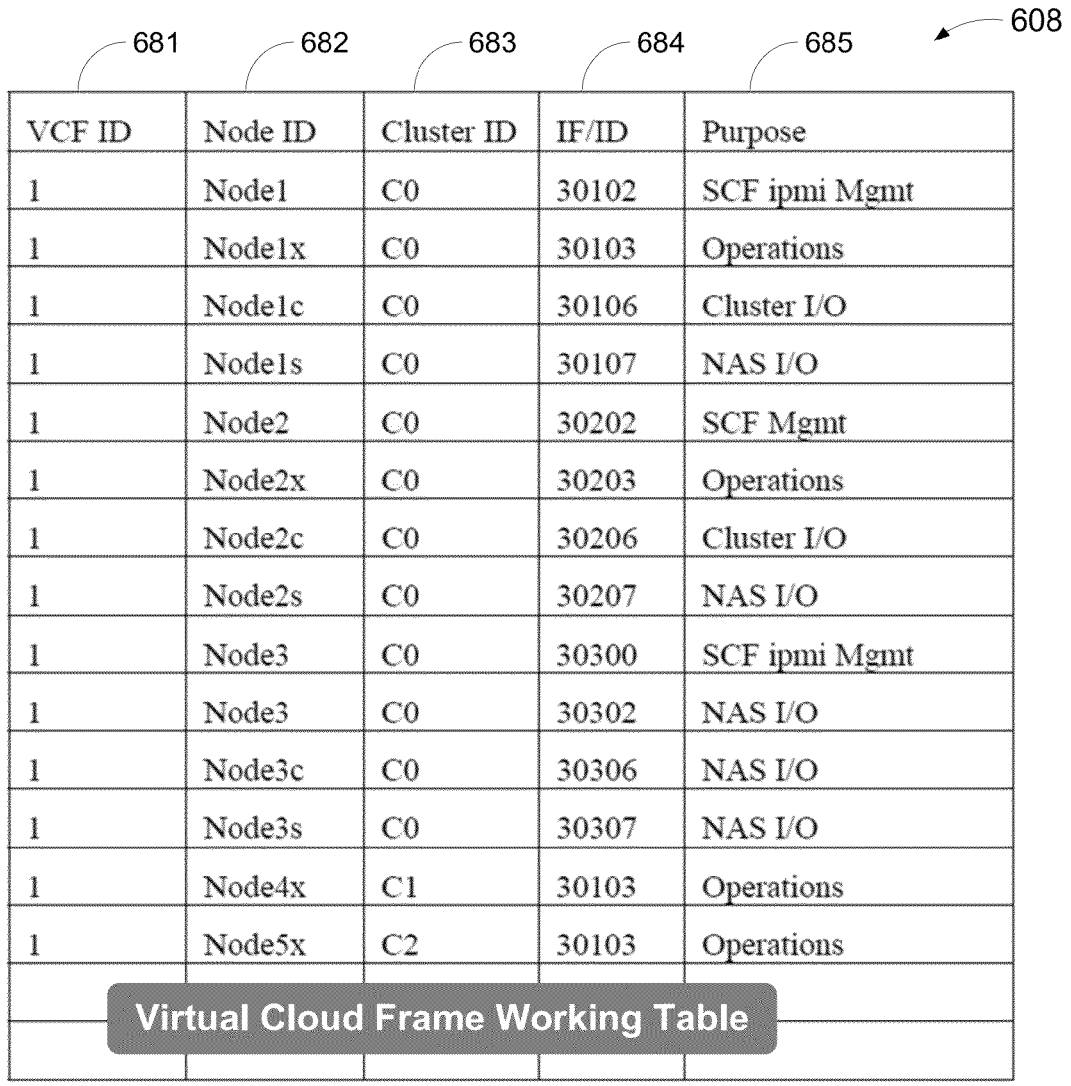

Referring now to FIGS. 6A-6D, in some embodiments, the operation data tables 122 may include a node interface table (602, FIG. 6A), a member table (604, FIG. 6B), a cluster table (606, FIG. 6C), and virtual cloud frame table (608, FIG. 6D). The data fields shown in the tables in FIGS. 6A-6D are illustrative. It will be appreciated that the operation data tables 122 in other embodiments may comprise a different set of operation data tables having different data fields.

In accordance with principles set forth in the present disclosure, the hardware nodes 1022 within a cloud frame (e.g., 200, FIG. 2) may be in an "inactive" state as indicated in the operation data tables 122. Hardware nodes that are in an "inactive" state may be freely associated with any cloud frame within the same cluster. Once an "inactive" hardware node becomes "active" in a cloud frame it is no longer "inactive" and therefore cannot be freely associated again until it is returned to the "inactive" state. For example, a storage node in the "inactive" state may be allocated to a cloud frame as a new or additional storage resource. In some embodiments, hardware nodes can only be "active" in one cloud frame at a time. This is not to be confused with collaborating cloud frames within a cluster of cloud frames, however. Cloud frames within a cluster may collaborate and share services with any and all of the cloud frames within a cluster as previously described in the section on clustering. In embodiments, hardware node association to cloud frames may be accomplished by several different methods. For example, self allocation, broadcast allocation, managed allocation, or user allocation. By example, we will describe some of these forms of allocation to show how embodiments would work.

Self Allocation

In some embodiments, a determination may be made by an actor (e.g., a user, an application, or a management service operating in the current computing backbone 102) that additional capacity is required, whether computing capacity, or storage capacity, etc. Using this self allocation method of provisioning, the actor may view, analyze, or otherwise access the operation data tables 122 to determine if there is an available hardware node matching the requested attributes. If one is found, the actor may attempt to capture that hardware node by using a local management service to change the operation data table entry directly for that node to "requested". Upon seeing that entry in the operation data table the requested node would respond by changing the entry to "active" thus completing the association of a new hardware node to a cloud frame. As another example, a storage node may detect that it is running low on capacity, and may attempt to allocate another storage node to expand its data capacity.

Referring to FIG. 7, a process flow illustrates steps for performing a "self allocation" in accordance with the present disclosure. In accordance with principles of the present disclosure, in some embodiments hardware nodes in a "cloud frame environment" comprising a single cloud frame or a cluster of cloud frames may act on their own to allocate and release needed resources during the course of their operation. In particular, a hardware node may identify and allocate a provider of a resource to itself without coordination from a central controlling entity, such as for example, the management services component 114 of the cloud frame.

Thus, in a step 702, a hardware node ("requiring hardware node") may detect that it requires a resource. For example, the requiring hardware node may be a computing node that has determined it requires additional storage capacity, a storage node may determine that it requires backup management, and so on. In another example, a user may designate (e.g., using the management services 114) that a particular hardware node requires a resource.

The required resource may be provided by another hardware node. For example, a computing node may provide computing resources, a management node may provide management services, and a storage node may provide storage capacity. The resource may be configured from one or more hardware nodes; e.g., data backup may be considered a resource that can be provided by a combination of a storage node to store the data to be backed up and a management node to schedule and otherwise manage the backup operation. In some embodiments, the resource may be outsourced to a service outside of the cloud frame environment using a hardware node (e.g., management node) acting as a proxy. And so on.

In a step 704, the requiring hardware node accesses operation data (e.g., in the operation data tables 602-608) in the cloud frame environment, which may be a single cloud frame or a cluster of cloud frames. In particular, operation data associated with the hardware nodes is accessed. The requiring hardware node may access the operation data internal to the cloud frame in which the requiring hardware node is installed (the "host" cloud frame), for example, using local management services 114 of the hardware node or cloud frame.

In a clustered configuration, step 704 may be facilitated using cross-communication services which can be provided by the management services component 114 in each cloud frame. Cross-communication services may allow cloud frames in a cluster to communicate with each other and to access information (e.g., operation data) from each other including reading and writing the accessed information. In embodiments, the requiring hardware node may first identify all the cloud frames in the cluster, for example, using the cluster table 606. The requiring hardware node may then access the operation data from each of the cloud frames using the cross-communication services.

In a step 706, the requiring hardware node may then identify a selected hardware node from among the hardware nodes in the cloud frame environment that may serve as a provider of the required resource. In embodiments, this step may include the requiring hardware node to scan the operation data associated with each of the hardware nodes in the cloud frame environment. In general, a set of criteria may be determined from the required resource. It will be appreciated the any suitable analytical tool may be used to identify the criteria. In some embodiments, the criteria may be identified by a user.

For example, suppose the required resource is storage capacity of at least 10 TBytes, is located 100 miles away, and supports data mirroring. The criteria for the required resource may therefore include 10TByte storage capacity, location is 100 miles, and data mirroring capability. Firstly, only hardware nodes in the same cloud frame that are storage nodes need to be considered, which may be accomplished by using operation data associated with each hardware node to identify only storage nodes. Next, the operation data associated with each storage node may then be analyzed to identify a matching storage node (the selected hardware node). It will be appreciated that any suitable search/matching algorithm may be applied to identify the selected hardware node.

In a step 708, the selected hardware node may be allocated to the requiring hardware node. The selected hardware node may be exclusively allocated to the requiring hardware node, or the allocation may be shared with other hardware nodes. The specific steps to accomplish this action will vary depending the particulars of a given embodiment of the cloud frame environment. In some embodiments, for example, the requiring hardware node may update the operation data associated with the selected hardware node to show that the selected hardware node is being used by the requiring hardware node. The requiring hardware node may also update its own associated operation data to indicate that it is using the selected hardware node. In some embodiments, the requiring hardware node may communicate with the selected hardware node to negotiate allocation of services to the requiring hardware node. The selected hardware node may update its own associated operation data to indicate that it is allocated to the requiring hardware node. It is worth noting that the hardware nodes involved in the transaction, namely the requiring hardware node and/or the selected hardware node, manage themselves and their own associated operation data to coordinate allocation of the selected hardware node to the requiring hardware node without coordination from a central controller.

In a step 710, after the resource (vis-à-vis the selected hardware node) has been allocated, subsequent communications may be conducted between the requiring hardware node and the selected hardware node during operation of the requiring hardware node.

In a step 712, at some later time, the selected hardware node may be released. For example, suppose a CRM system (i.e., the requiring hardware node) needs an invoice generating service to send out monthly invoices. The invoice generating service may be a computing node that is configured to generate invoices (i.e., the selected hardware node). The invoice generating service may be allocated to the CRM system to generate invoices. When the task is completed, the invoice generating service may be released. For example, the CRM system may explicitly release the hardware node hosting the invoice generating service by updating operation data associated with the invoice generating service. The invoice generating service, itself, may update its own associated operation data.

Broadcast Allocation

In some embodiments, a determination may be made that one or more resources are needed to enhance the current computing backbone 102. Using the broadcast allocation method of provisioning, a user, an application, or a management service may use a local management service to place a "requested" entry in the operation data tables 122. In this method, however, the request is not placed in a specific hardware node entry but rather in a blank entry, where there is no hardware node specified. One or more "inactive" hardware nodes matching the request preferences can add a "pending" entry that includes it's hardware node information along with the other request entry information. As the operation data tables propagate back to the requester it will see one or more pending entries for its request. The requesting hardware node will now choose as many of the pending entries that it needs and formally request the hardware node to join it's cloud frame. From this point on the protocol would proceed like the self-allocation method previously described. More than one hardware node that requires a resource may broadcast that fact using the method just described to the other hardware nodes in the cloud frame environment, comprising either a single cloud frame or a cluster of cloud frames. Race conditions and contentions are resolved by the subsequent specific request made by the original broadcasting requester.

Referring to FIG. 8, a process flow illustrates steps for performing a "broadcast allocation" in accordance with the present disclosure. In accordance with principles of the present disclosure, in some embodiments hardware nodes may act on their own to allocate themselves to provide a needed resource, without coordination from a central controlling entity.

Thus, in a step 802, a hardware node may detect that it requires a resource. For example, the requiring hardware node may be a computing node that has determined it requires additional storage capacity, a storage node may determine that it requires backup management, and so on. In some embodiments, a user may designate (e.g., using the management services 114) that a particular hardware node requires a resource.

In a step 804, the requiring hardware node may broadcast the required resource by making a request with a blank hardware node ID. In some embodiments, the requiring hardware node may access its own associated operation data (e.g., using the management services 114), and update the operation data with information that indicates the required resource. For example, in an embodiment, the operation data may have an explicit data field called "Required Resource" where criteria specifying the required resource may be stored. In another embodiment, the operation data associated with each hardware node may include a table listing resources that are allocated to that hardware node, including identifiers of hardware nodes providing the resources along with corresponding information describing the resource. An entry in such a table for the requiring hardware node may be made with a description of the required resource, but without the identifier. The absence of the identifier may be taken to mean that the resource has not been allocated.

In a step 806, each hardware node in the cloud frame environment may be configured to periodically query the operation data associated with each of the other hardware nodes in the cloud frame environment. In a cluster of cloud frames, a hardware node in one cloud frame may access the operation data in another cloud frame using a suitable cross-communication service, such as explained above. If a hardware node making the query comes across the operation data associated with the requiring hardware node and determines, from the operation data, that it is able and available to provide the required resource indicated in the operation data, then the hardware node making the inquiry may be deemed a provider of the required resource (the "providing hardware node").

In a step 808, the providing hardware node may take steps to initiate allocating itself to the requiring hardware node. The providing hardware node may be exclusively allocated to the requiring hardware node, or the allocation may be shared with other hardware nodes. The specific steps to accomplish this action will vary depending on the particulars of a given embodiment of the cloud frame environment. In some embodiments, for example, the providing hardware node may update the operation data associated with the requiring hardware node to show that the providing hardware node is being used by the requiring hardware node. The providing hardware node may also update its own associated operation data to indicate that it is being used by the requiring hardware node. In some embodiments, the providing hardware node may communicate with the requiring hardware node to negotiate allocation of services to the requiring hardware node. The providing hardware node may update its own associated operation data to indicate that it is allocated to the requiring hardware node. It is worth noting that the hardware nodes involved in the transaction, namely the requiring hardware node and/or the providing hardware node, manage themselves and their own associated operation data to coordinate allocation of the providing hardware node to the requiring hardware node without coordination from a central controller. In some embodiments, the hardware nodes 1022 may use a synchronization scheme to propagate the operation data table information across the private communication network 104 among themselves so that the information remains consistent across the Cloud Frame and Cloud Frame Cluster.

In a step 810, after the resource (vis-à-vis the provided hardware node) has been allocated, subsequent communications may be conducted between the requiring hardware node and the providing hardware node during operation of the requiring hardware node. In a step 812, at some later time, the providing hardware node may be released in a manner similar to step 712 in FIG. 7.

Managed Allocation

In some embodiments, a management service running in the current computing backbone 102 may determine that additional resources (e.g., a computing node) with particular attributes is required. The management service may then be able to request that an additional computing node be brought into the cloud frame. The request may also contain preferences such as memory size, CPU cores, services available, etc. Using this managed allocation method of provisioning, the management service would analyze the operation data tables to see if there is an available hardware node matching the request preferences. If one is found the management service would capture that hardware node by changing the operation data table entry for that node to "requested". Upon seeing that entry in the operation data table each inactive hardware node would evaluate the preferences for a match. If there is a match it would respond by changing the entry from "requested" to "active" thus completing the association of a new hardware node to a cloud frame.

Referring to FIG. 9, in a step 902 a determination is made that a cloud frame is in need of a resource. In one embodiment, a user may access the management services 114 and initiate allocation processing, including specifying which hardware node needs the resource and specifying details of the resource. In another embodiment, the requiring hardware node may update its own associated operation data to indicate the required resource. The management services 114 may then periodically scan its operation data tables 122 to identify if any of its hardware nodes are in need of a resource.

In a step 904, the management services 114 may then scan its operation data tables 122 in order to find a hardware node that can provide the required resource. In the case of a cluster of cloud frames, the management services 114 may attempt to find a hardware node in other cloud frames by communicating with the management services components 114 in those other cloud frames.

In a step 906, if a hardware node that can provide the required resource is found (the "found hardware node"), then it can be allocated to the cloud frame of the requiring hardware node. The found hardware node may be used exclusively by the requiring hardware node, or may be shared with other hardware nodes in the cloud frame. In embodiments, the management services 114 may update the operation data associated with the found hardware node to indicate that it has been allocated to the requiring cloud frame. The management services 114 may updated the operation data associated with the cloud frame of the requiring hardware node to indicate that it is using resources of the found hardware node.

In a step 908, after the resource (vis-à-vis the found hardware node) has been allocated, subsequent communications may be conducted between the requiring hardware node and the found hardware node during operation of the requiring hardware node. In a step 910, at some later time, the found hardware node may be released in a manner similar to step 712 in FIG. 7.

User Allocation

In some embodiments, a cloud frame user or administrator may determine that additional resources will be required for an upcoming activity (e.g., end of month statements). A user may access the cloud frame using the management services 114. Tools provided by the management services 114 may allow the user to view and update operation tables to identify required resources and hardware nodes that can provide resources, and tools to allocate those resources. In a cluster of cloud frames, the user may use cross-communication services described above to access any of the cloud frames in the cluster. Using these tools the user can cause the necessary changes in the operation data tables to request additional resources to be added to a cloud frame.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

ADVANTAGES AND TECHNICAL EFFECT

The emergence of cloud computing and hardware plus software appliances in the enterprise space has motivated the necessity of integrating hardware into solutions in a manner that provides a requisite level of uniformity, flexibility, scalability, and manageability across a variety of deployment landscapes. These landscapes include on-premise, private cloud, and public cloud deployment environments Traditional software technologies in virtualization and cloud management, do not adequately address the present and future challenges. The cloud frame architecture of the present disclosure establishes a reasonable framework to support the idea of deploying hardware and software that can deliver optimal software-based solutions at the lowest total cost of ownership (TCO) possible. The cloud frame takes into consideration all phases of the solution hardware and software lifecycle from the ordering process through testing, quality assurance (QA), production, and maintenance. The cloud frame architecture disclosed herein also integrates with existing management and maintenance processes designed and operated by the customer.

What is claimed is:

1. A method in a first cloud frame comprising a plurality of hardware nodes, the method comprising:
the hardware nodes of the first cloud frame conducting communications with each other using only communication channels between the hardware nodes provided by a private communication network;
the first cloud frame forming a cluster of cloud frames by communicating with at least a second cloud frame separate from the first cloud frame, wherein communications between the first and second cloud frames only occur across predefined communication channels interconnected to the private communication network, including:
an application services communication channel for communications between applications running on the first cloud frame and the second cloud frame;
an administrative services communication channel for communications between management services of the first cloud frame and the second cloud frame;
a data management services communication channel for exchanging data between the first cloud frame and the second cloud frame.

2. The method of claim 1 further comprising:
storing a plurality of operation data associated with each hardware node; and
each hardware node updating its associated operation data, the associated operation data representative of operating status of said each hardware node.

3. The method of claim 1 further comprising a first hardware node in the first cloud frame acquiring a resource from one or more other hardware nodes in the first cloud frame, including:
the first hardware node accessing operation data associated with the other hardware nodes;
the first hardware node identifying a selected hardware node as a provider of the resource using the operation data associated with the other hardware nodes;
updating operation data associated with the first hardware node and operation data associated with the selected hardware node to indicate an operational relationship between the first hardware node and the selected hardware node; and
conducting communications between the first hardware node and the selected hardware node to access the resource provided by the selected node.

4. The method of claim 3 wherein the first hardware node acquiring a resource further includes the first hardware node accessing operation data associated with hardware nodes in the first cloud frame and hardware nodes in the second cloud frame, wherein the selected hardware node is a hardware node in either the first cloud frame or the second cloud frame.

5. The method of claim 3 further comprising creating a virtual cloud frame comprising hardware nodes from the first cloud frame and the second cloud frame.

6. The method of claim 1 further comprising a second hardware node acquiring a resource, including:
the second hardware node storing information indicative of the required resource in the operation data associated with the second hardware node;
one of the hardware nodes accessing the information in the operation data associated with the second hardware node; and
responsive to the information, said one of the hardware nodes initiating communications with the second hardware node to serve as a provider of the resource to the second hardware node.

7. The method of claim 1 further comprising, when a certified hardware node is connected to the private communication network, then providing a communication channel between the certified hardware node and one or more of the hardware nodes of the cloud frame.

8. The method of claim 1 further comprising, when an uncertified hardware node is connected to the private communication network, then providing an isolated communication channel that is isolated from all other communication channels provided by the private communication network and conducting all communications with the uncertified hardware node using only the isolated communication channel.

9. The method of claim 8 wherein the isolated communication channel is connected to an isolated network.

10. The method of claim 1 wherein the hardware nodes include one or more storage systems.

11. The method of claim 1 wherein the hardware nodes include one or more computer processing systems configured to execute software applications.

12. The method of claim 11 wherein the software applications include business applications or management applications.

13. The method of claim 1 wherein each of the predefined communication channels includes an interface associated with a unique IP address.

14. A system having at least a first cloud frame comprising:
a computing backbone;
a private communication network; and
a plurality of hardware nodes connected to the private communication network, the hardware nodes communicating with each other using only communication channels provided by the private communication network,
wherein the first cloud frame is configured to communicate with a second cloud frame separate from the first cloud frame using only predefined communication channels interconnected to the private communication network, including:
an application services communication channel for communications between applications running on the first cloud frame and the second cloud frame;
an administrative services communication channel for communications between management services of the first cloud frame and the second cloud frame; and
a data management services communication channel for exchanging data between the first cloud frame and the second cloud frame.

15. The system of claim 14 wherein a first hardware node in the first cloud frame is configured to acquire a resource from one or more other hardware nodes in the first cloud frame, including:
the first hardware node accessing operation data associated with the other hardware nodes;
the first hardware node identifying a selected hardware node as a provider of the resource using the operation data associated with the other hardware nodes;
updating operation data associated with the first hardware node and updating operation data associated with the selected hardware node to indicate an operational relationship between the first hardware node and the selected hardware node; and
conducting communications between the first hardware node and the selected hardware node to access the resource provided by the selected node.

16. The system of claim 15 wherein the first hardware node acquires a resource by performing further step of the first hardware node accessing operation data associated with hardware nodes in the first cloud frame and hardware nodes in the second cloud frame, wherein the selected hardware node is a hardware node in either the first cloud frame or the second cloud frame.

17. The system of claim 15 further comprising a virtual cloud frame comprising hardware nodes from the first cloud frame and hardware nodes from the second cloud frame.

18. The system of claim 14 wherein, when a certified hardware node is connected to the private communication network, the computing backbone is configured to establish a communication channel between the certified hardware node and one or more of the hardware nodes of the cloud frame.

19. The system of claim 14 wherein, when an uncertified hardware node is connected to the private communication network, then providing an isolated communication channel that is isolated from all other communication channels provided by the private communication network and conducting all communications with the uncertified hardware node using only the isolated communication channel.

20. The system of claim 19 wherein the isolated communication channel is connected to an isolated network.

21. The system of claim 14 wherein each of the predefined communication channels includes an interface associated with a unique IP address.

22. A system having at least a first cloud frame comprising:
computing means for a computing backbone;
communication means for a private communication network; and
a plurality of hardware nodes connected to the communication means, the hardware nodes communicating with each other using only communication channels provided by the private communication network,
wherein the first cloud frame is configured to communicate with a second cloud frame separate from the first cloud frame using only predefined communication channels interconnected to the private communication network, including:
an application services communication channel for communications between applications running on the first cloud frame and the second cloud frame;
an administrative services communication channel for communications between management services of the first cloud frame and the second cloud frame; and
a data management services communication channel for exchanging data between the first cloud frame and the second cloud frame.

23. The system of claim 22 wherein each of the predefined communication channels includes an interface associated with a unique IP address.

* * * * *